(12) United States Patent
Fujieda et al.

(10) Patent No.: US 8,313,319 B2
(45) Date of Patent: Nov. 20, 2012

(54) POST CURE INFLATOR

(75) Inventors: Yasuhiko Fujieda, Takasago (JP); Masaharu Shibata, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 12 days.

(21) Appl. No.: 12/983,470

(22) Filed: Jan. 3, 2011

(65) Prior Publication Data
US 2011/0189324 A1 Aug. 4, 2011

(30) Foreign Application Priority Data

Feb. 2, 2010 (JP) ................................. 2010-020848

(51) Int. Cl.
*B29C 35/16* (2006.01)
(52) U.S. Cl. .................................................... 425/58.1
(58) Field of Classification Search ................... 425/38, 425/58.1
See application file for complete search history.

(56) References Cited

U.S. PATENT DOCUMENTS

| | | | | |
|---|---|---|---|---|
| 4,124,337 A | * | 11/1978 | Martin | 425/58.1 |
| 4,401,422 A | * | 8/1983 | Amano et al. | 425/38 |
| 4,944,951 A | * | 7/1990 | Katayama et al. | 425/58.1 |
| 5,225,138 A | | 7/1993 | Irie | |
| 5,352,104 A | | 10/1994 | Ichikawa et al. | |
| 5,441,393 A | * | 8/1995 | Fujieda et al. | 425/58.1 |
| 8,079,124 B2 | * | 12/2011 | Fujieda | 425/58.1 |
| 2009/0155399 A1 | | 6/2009 | Fujieda | |

FOREIGN PATENT DOCUMENTS

| | | |
|---|---|---|
| DE | 41 32 827 A1 | 4/1992 |
| JP | 63-264307 | 11/1988 |
| JP | 9-70833 | 3/1997 |

OTHER PUBLICATIONS

Extended European Search Report issued Jun. 27, 2011, in European Patent Application No. 10197289 1.

* cited by examiner

*Primary Examiner* — James Mackey
(74) *Attorney, Agent, or Firm* — Oblon, Spivak, McClelland, Maier & Neustadt, L.L.P.

(57) ABSTRACT

A post cure inflator of the present invention is an apparatus for inflating and cooling a vulcanized tire T by sealing high pressure air into the vulcanized tire, and includes an annular rim for gripping the vulcanized tire at a bead portion, a connecting member fixed at one end portion thereof to the rim, a rim supporting member provided in a body frame, and a clamping device provided in the rim supporting member to clamp the connecting member to the rim supporting member unclampably. This construction permits a post cure inflator in which replacement of the rim is easy and an existing rim can be used.

6 Claims, 6 Drawing Sheets

POST CURE INFLATOR

BACKGROUND OF THE INVENTION

1. Field of the Invention

The present invention relates to a post cure inflator for inflating and cooling a vulcanized tire by sealing high pressure air into the vulcanized tire.

2. Description of the Related Art

A reinforcing cord is embedded within a tire and, as the material of the reinforcing cord, there is used a chemical fiber material, e.g., polyester or nylon fiber. In manufacturing such a tire, if the tire after vulcanized is merely left to cool, the tire will be deformed due to a difference in the amount of contraction between rubber which constitutes the tire and the reinforcing cord. To prevent such a deformation, equipment called a post cure inflator has heretofore been used. According to this conventional equipment, high pressure air is sealed into a tire after vulcanized to maintain the tire in a proper shape and in this state the tire is cooled to a temperature (usually at 100° C. or below) at which the reinforcing cord ceases to contract.

The post cure inflator is provided with two annular rims for supporting bead portions of a tire in a sealed state. The rims are replaced according to the bead diameter of the tire to be treated. In the conventional post cure inflator, the rims are mounted to a body frame of the post cure inflator removably with bolts. When replacing the rims, therefore, it has been necessary to install and remove the bolts by a hand work. However, the rims are heavy (e.g., 10 kg or more per piece) and the footing of the working space for replacing rims is bad, therefore the operation for mounting and removing the rims with bolts to and from the body frame has imposed a heavy burden on the worker.

For facilitating the rim replacing work, for example Japanese Patent Laid-Open No. Hei 9 (1997)-70833 proposes a post cure inflator. This conventional post cure inflator includes upper and lower rims, rim mounting pieces fixed with bolts to surfaces on the side opposite to tire supporting surfaces of the upper and lower rims, two positioning guide pins provided on a body frame and extending in the vertical direction, and two rim mounting cylinders provided on the body frame. The rim mounting pieces are each formed with a hole extending therethrough radially of the rim. A rod of a rim mounting cylinder is fitted in the hole, whereby each rim mounting piece is secured to the body frame removably. Further, each rim is formed with a conical hole extending vertically through the rim, and a positioning guide pin is inserted into the conical hole.

When mounting each rim to the body frame, the rim and the associated rim mounting piece are fixed together integrally and the rim is positioned with respect to the body frame so that the positioning guide pin can be inserted into the conical hole of the rim. Thereafter, the rim and the rim mounting piece are put on the rim mounting surface, allowing the rim mounting cylinder to be fitted in the hole of the rim mounting piece. For removing the rim from the body frame there is performed a procedure reverse to the mounting procedure. By thus causing the rim and the rim mounting piece to raise and lower in the integrated state with respect to the body frame, the rim and the rim mounting piece can be mounted and removed to and from the body frame. Consequently, the mounting and removal of bolts become unnecessary and the replacement of rim can be done in a relatively easy manner.

However, in the case of the above-mentioned conventional post cure inflator, a conical hole for insertion therein of a positioning guide pin is formed in each rim to effect positioning at the time of mounting the rim to the body frame. Therefore, the existing rims used in the conventional post cure inflator cannot be used as they are and it is necessary to newly fabricate rims. Usually, a tire factory manufactures tires of various sizes and possesses a large number of rims different in rim diameter. For this reason it is desirable that existing rims be employable as they are.

SUMMARY OF THE INVENTION

It is an object of the present invention to provide a post cure inflator which permits easy replacement of rims and permits the use of existing rims.

According to the present invention there is provided a post cure inflator for inflating and cooling a vulcanized tire by sealing high pressure air into the vulcanized tire, the post cure inflator comprising: a body frame; a rim for supporting the vulcanized tire at a bead portion of the vulcanized tire; a connecting member fixed at one end thereof to the rim; a rim supporting member provided in the body frame; and a clamping device provided in either the body frame or the rim supporting member to clamp the connecting member to the rim supporting member unclampably.

According to this construction, the rim is fixed to the connecting member, and the connecting member is clamped unclampably by the clamping device to the rim supporting member provided in the body frame. Therefore, when removing the rim from the body frame, the clamping device is switched to an unclamping state and the connecting member together with the rim is removed from the rim supporting member. Conversely, when mounting the rim to the body frame, the connecting member with the rim fixed thereto is mounted to the rim supporting member with use of the clamping device.

Thus, since the clamping device is used for the mounting and removal of the connecting member to and from the rim supporting member, the mounting and removing operations can be done easily. Thus, it is possible to easily carry out the replacement of rim.

Moreover, since the rim is mounted to the body frame through the connecting member, an existing rim can be used as it is by forming one end of the connecting member in a shape matching the shape of the existing rim and by forming an opposite end of the connecting member in a shape matching the shape of the rim supporting member provided in the body frame.

In the post cure inflator of the present invention there may be adopted a construction wherein the connecting member is formed in a cylindrical shape, one end portion in a cylinder axis direction of the connecting member is fitted in the rim, and an opposite end portion in the cylinder axis direction of the connecting member is clamped to the rim supporting member unclampably by the clamping device.

According to this construction, since the connecting member is fixed in a state in which it is fitted in the rim, it is possible to use a common connecting member irrespective of the size of the outside diameter of the rim.

In the post cure inflator of the present invention there may be adopted a construction wherein an annular flange portion is formed at the opposite end portion of the connecting member and the annular flange portion is clamped to the rim supporting member unclampably by the clamping device.

According to this construction, since the flange portion of the connecting member is annular, it can be clamped at any position in the circumferential direction by the clamping device. Therefore, when the connecting member with the rim fixed thereto is to be mounted to the rim supporting member, it is not necessary to perform a circumferential alignment between the connecting member and the rim supporting member, thus permitting the rim replacing work to be done more easily.

In the post cure inflator of the present invention there may be adopted a construction wherein the upper and lower rims are disposed side by side in the vertical direction on the body frame, and the post cure inflator further comprises a conveyance device for loading and unloading of the vulcanized tire, the conveyance device including a plurality of chuck members arranged side by side in the circumferential direction of the vulcanized tire and projecting radially outwards, the chuck members being formed with tire grasping pawls respectively for supporting the vulcanized tire from inside, chuck member drive means for moving the plural chuck members radially of the vulcanized tire, and moving means for moving the plural chuck members in the vertical and horizontal directions, the chuck members being formed with, in addition to the tire grasping pawls, rim supporting pawls projecting radially inwards of the vulcanized tire to support, from outside, one of the rims which is disposed on a lower side or one of the connecting members which is disposed on a lower side.

After inserting the plural chuck members inside the vulcanized tire, the plural chuck members are moved radially outwards of the vulcanized tire by the chuck member drive means, allowing the vulcanized tire to be supported from inside by the tire grasping pawls. Thus, the plural chuck members are moved by the moving means in a state in which the vulcanized tire is held by the plural chuck members, whereby it is possible to effect loading and unloading of the vulcanized tire.

The plural chuck members are respectively provided with rim supporting pawls projecting radially inwards of the vulcanized tire, in addition to the tire grasping pawls. The plural chuck members are disposed outside a stacked body of vertically stacked upper and lower rims with two connecting members fixed thereto respectively and then the plural chuck members are moved radially inwards by the chuck member drive means, allowing the rim supporting pawls to support the lower rim or the lower connecting member from outside. By so doing, the upper and lower rims and the two connecting members of the rims can be held together by the plural chuck members.

When replacing the rims, therefore, with use of the above conveyance device, it is possible to effect loading and unloading of the upper and lower rims and the connecting members of the rims with respect to the body frame. Thus, in comparison with manual conveyance of the rims, not only the replacement of rims can be done more easily, but also the time required for the rim replacement can be shortened.

In the post cure inflator of the present invention, the clamping device may be a fluid pressure-actuated swing type clamping device.

The swing type clamping device is constructed such that a tip piece called swing arm rotates by a predetermined angle (e.g., 90°) and thereafter moves in a rotational axis direction to urge an object to be clamped. With such a swing type clamping device, the tip piece of the clamping device can be engaged with the connecting member disengageably. Therefore, the tip piece does not obstruct the vertical movement of the rim for replacing operation, and the rim replacing operation can be done smoothly.

In the post cure inflator of the present invention, the body frame may be configured so as to be capable of adjusting the spacing between the upper and lower rims that support the tire, and the body frame may include a motor for adjusting the spacing between the rims.

In the post cure inflator, an optimum rim-to-rim spacing differs according to the type of a tire to be treated, so after the replacement of rims it is usually required to adjust the rim-to-rim spacing. The body frame used in the post cure inflator of the present invention constructed as above is configured so as to permit adjustment of the rim-to-rim spacing. Further, adjustment of the rim-to-rim spacing is performed by means of a motor drive. Accordingly, in comparison with manually adjusting the rim-to-rim spacing, not only it is possible to adjust the rim-to-rim spacing easily but also the time required for adjusting the rim-to-rim spacing can be shortened.

DETAILED DESCRIPTION OF THE PREFERRED EMBODIMENTS

An embodiment of the present invention will be described below.

Figure 1:
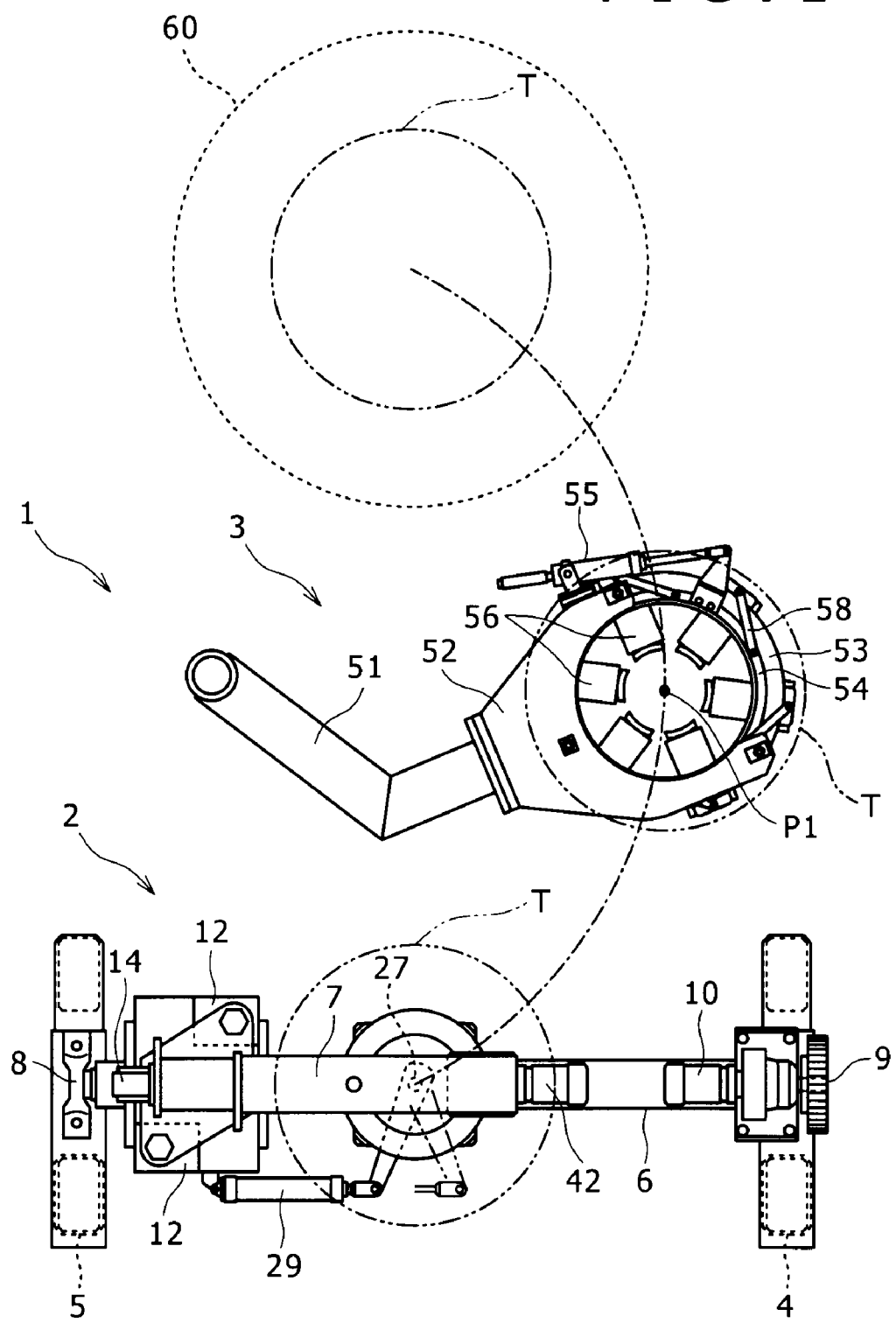
FIG. 1 is a plan view of a post cure inflator according to an embodiment of the present invention.

As shown in FIG. 1, a post cure inflator 1 of this embodiment includes a post cure inflator body 2 spaced a predetermined distance from a vulcanizer 60 to inflate and cool a tire T after vulcanized by the vulcanizer 60 and a conveyance device 3 disposed between the vulcanizer 60 and the post cure inflator body 2. The vulcanizer 60 is configured to perform vulcanization and forming for an unvulcanized tire T inside molds (not shown) which can open and close vertically.

Figure 2:
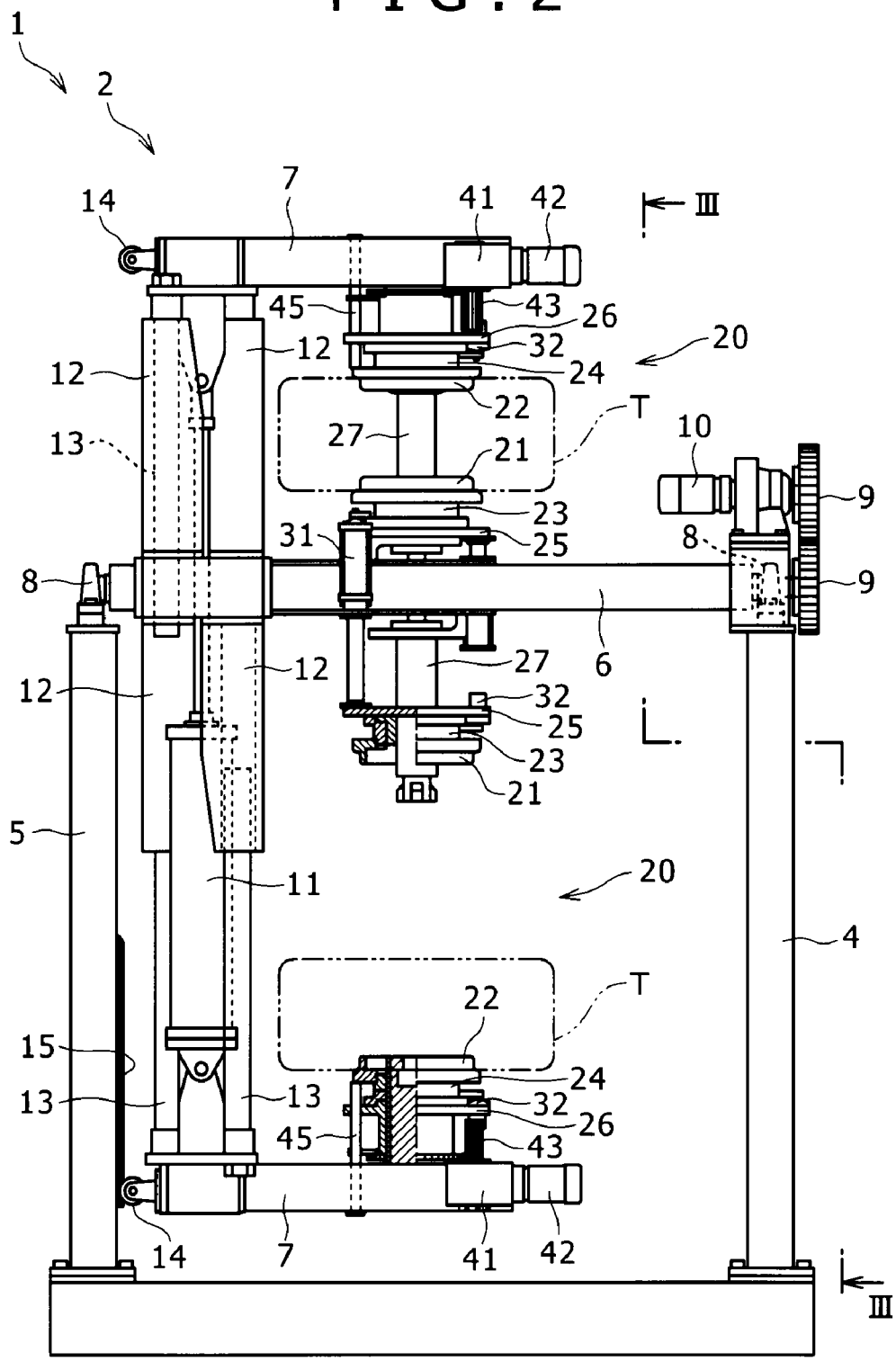
FIG. 2 is a front view of the post cure inflator.

A shown in FIG. 2, the post cure inflator body 2 includes two side frames 4, 5, a center frame 6 provided between the two side frames 4, 5 to extend in the horizontal direction, two lift beams 7, 7 disposed on upper and lower sides respectively of the center frame 6, two tire holding mechanisms 20, 20 disposed respectively between the upper lift beam 7 and the center frame 6 and between the lower lift beam 7 and the center frame 6. Though the details will be described later, each tire holding mechanism 20 includes upper and lower rims 21, 22 for supporting the tire T and thereby holds the vulcanized tire T in a predetermined state while the vulcanized tire is subjected to inflation and cooling. In the post cure inflator body 2, the two tire holding mechanisms 20 can be inverted vertically about the center frame 6 so that two vulcanized tires T can be subjected to the inflating/cooling process. Mounting and removal of each tire T and replacement of the upper and lower rims 21, 22 are performed in the tire holding mechanism 20 which is positioned on the lower side.

As shown in FIG. 2, the center frame 6 extends in the horizontal direction (in the right-left direction in FIGS. 1 and 2) and is supported between the side frames 4, 5 rotatably through bearings 8. At one end (the right end in FIGS. 1 and 2) of the center frame 6 are provided two gears 9, 9 and a motor 10. The center frame 6 is rotated by operation of the motor 10. The positions of the two tire holding mechanisms 20 are inverted vertically by rotating the center frame 6 by 180°.

The two lift beams 7, 7 are disposed on both upper and lower sides respectively of the center frame 6 and in parallel with the center frame 6. The two lift beams 7, 7 are connected with each other through a drive cylinder 11 (e.g., a fluid cylinder or a power cylinder). Two guide rods 13, 13 are erected on each lift beam 7 and extend toward the center frame 6. The guide rods 13 are movably inserted into cylindrical guide brackets 12 respectively which are erected on both upper and lower surfaces of the center frame 6. By mutual locking engagement of a locking shaft 27 and a lock member 40 of the upper tire holding mechanism 20 both to be described later, the upper lift beam 7 is made immovable in the vertical direction with respect to the center frame 6. In this state the drive cylinder 11 is actuated for expansion or contraction, whereby the lower lift beam 7 moves vertically.

A guide roller 14 is attached to the left end in FIGS. 1 and 2 of each lift beam 7 and a vertically extending guide rail 15, with which the guide roller 14 can be engaged, is attached to the lower side of the side frame 5. Consequently, when the drive cylinder 11 is in its extended state, the attitude of the lower lift beam 7 can be stabilized.

The two tire holding mechanisms 20 are of the same construction and therefore the tire holding mechanism 20 positioned on the lower side will be described below.

Figure 4:
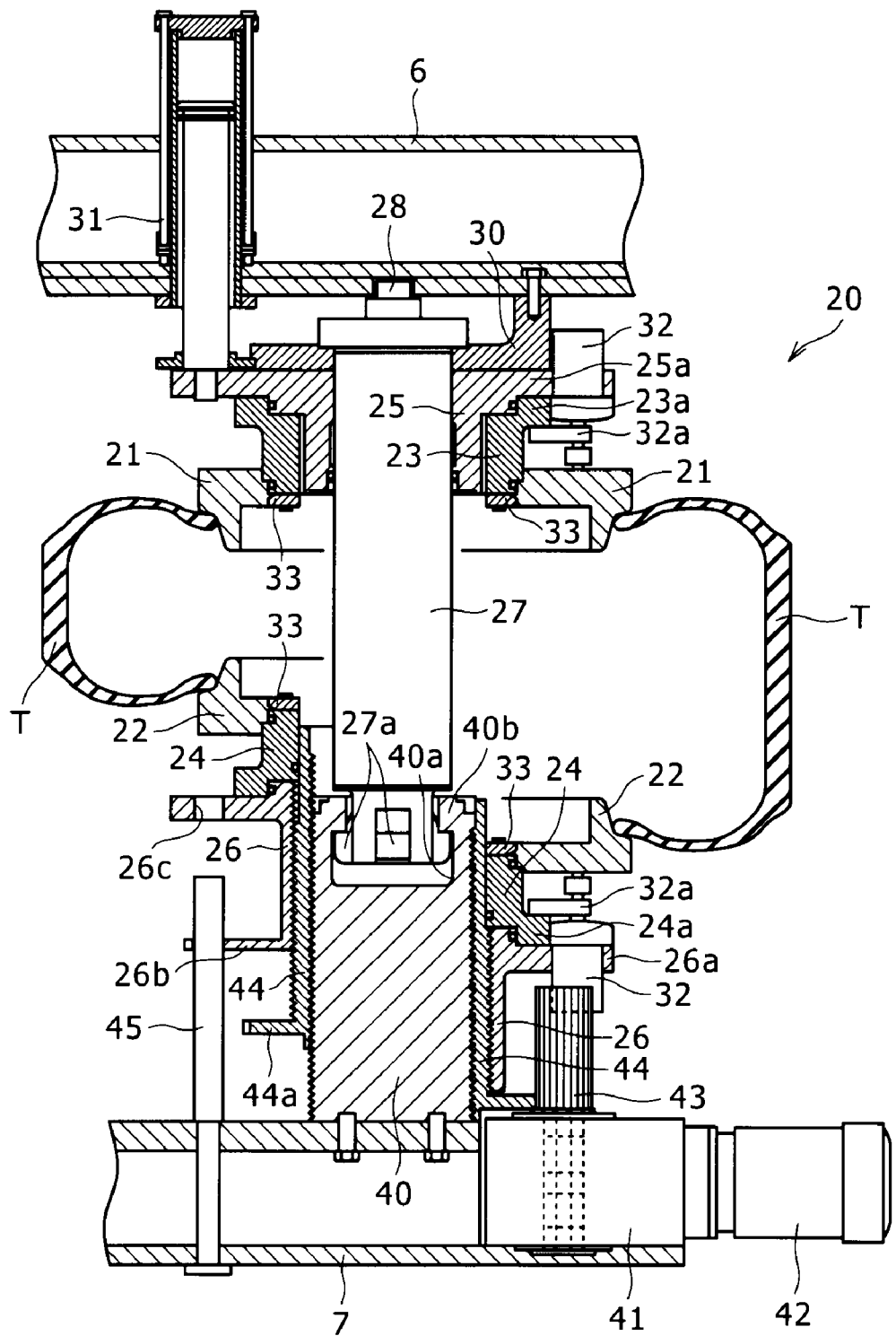
FIG. 4 is a partial enlarged sectional view of the post cure inflator.

As shown in FIG. 4, the tire holding mechanism 20 includes an upper rim 21, a lower rim 22, two connecting members 23, 24, an upper rim supporting member 25, a lower rim supporting member 26, clamping devices 32, a locking shaft 27, a lock member 40 and the like. The right-hand portion of FIG. 4 shows a case where the tire T to be subjected to inflation and cooling is large and the spacing between the upper and lower rims 21, 22 becomes maximum in the inflating/cooling process, while the left-hand portion of FIG. 4 shows a case where the tire T is small and the spacing between the upper and lower rims 21, 22 is relatively small in the inflating/cooling process.

Figure 3:
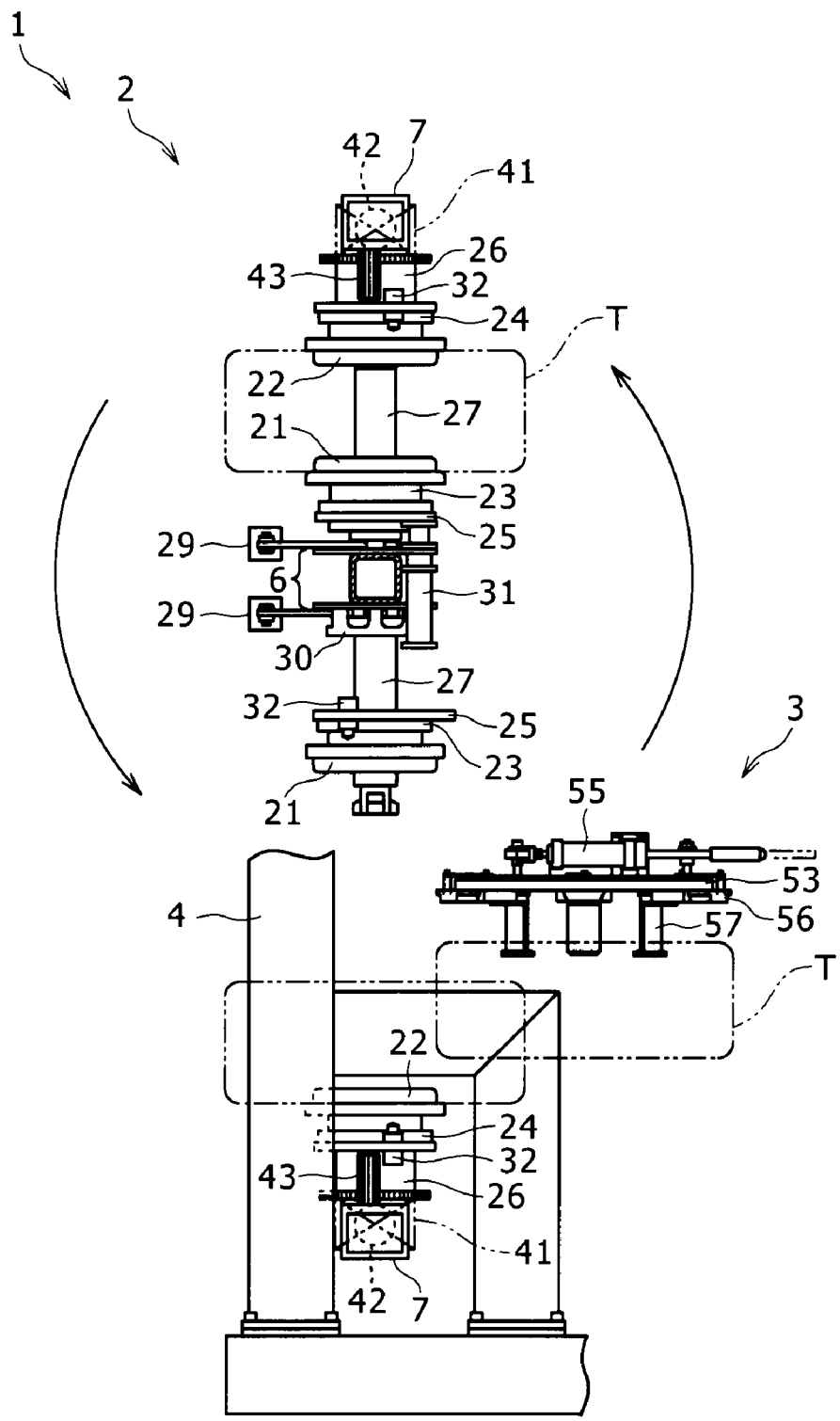
FIG. 3 is a sectional view taken on line III-III in FIG. 2.

An upper end portion of the locking shaft 27 is connected to a lower surface of the center frame 6 rotatably through a bush (bearing bush) 28. As shown in FIGS. 1 and 3, a cylinder rod of a drive cylinder 29 (e.g., a fluid cylinder or a power cylinder) fixed to the center frame 6 is connected to near the upper end of the locking shaft 27 through an arm-like member. By operation of the drive cylinder 29, the locking shaft 27 is rotated a predetermined angle (45° in FIG. 1).

Plural pawl portions 27a for bayonet locking are formed on an outer periphery of a lower end portion of the locking shaft 27. The pawl portions 27a are formed side by side in the circumferential direction. The lower end portion of the locking shaft 27 is inserted into a concave portion 40a of the lock member 40 to be described later and is engaged (locked) disengageably to plural pawl portions 40b formed on an upper portion of the concave portion 40a. The locking is performed in the following procedure. By inserting the lower end portion of the locking shaft 27 into the concave portion 40a and by rotating the locking shaft 27 by a predetermined angle, the plural pawl portions 27a of the locking shaft 27 come into engagement with the plural pawl portions 40b respectively, whereby the locking shaft 27 and the lock member 40 are locked to each other.

A stopper member 30 is fixed to the lower surface of the center frame 6 and the upper rim supporting member 25 is disposed under the stopper member 30. The upper rim supporting member 25 is a cylindrical plate with multi-stepped outer diameter (three steps in FIG. 3) and the locking shaft 27 is inserted through the upper rim supporting member 25 along an inner periphery of the upper rim supporting member 25 so as to be movable relatively in the vertical direction. Further, a supply/discharge path (not shown) for the supply of high pressure air into the tire T from the exterior and for the discharge thereof is formed in the interior of the upper rim supporting member 25.

An annular flange portion 25a is formed at an outer periphery of an upper end portion (center frame 6 side) of the upper rim supporting member 25. A cylinder rod of drive cylinders 31 (e.g., a fluid cylinder or a power cylinder) fixed to the center frame 6 is connected to the flange portion 25a. The upper rim supporting member 25 is connected to the center frame 6 through the drive cylinders 31 and is urged downwards by the drive cylinders 31. With high pressure air sealed within the tire T, an upward force which the upper rim supporting member 25 undergoes from the air pressure in the tire is larger than the force of the drive cylinders 31, so that the top surface of the upper rim supporting member 25 is in abutment against the bottom surface of the stopper member 30, as shown in FIG. 4.

Clamping devices 32 are mounted at a position circumferentially phase-shifted from the position where the cylinder rod of the drive cylinders 31 is connected to the flange portion 25a of the upper rim supporting member 25. Each clamping device 32 is an air pressure-actuated swing type clamping device. Each clamping device 32 includes a body portion having a projecting shaft and a swing arm 32a fixed to a tip of the shaft and extending in a direction (horizontal direction in FIG. 4) orthogonal to the axial direction of the shaft. By introducing high pressure air into a clamping-side port of the body portion, the shaft and the swing arm 32a rotate 90° relative to the body portion and thereafter retract into the body portion (clamping state). On the other hand, by supplying high pressure air to an unclamping-side port from the interior of the body portion and discharging high pressure air from the clamping-side port, the shaft and the swing arm 32a project from the body portion and thereafter rotate 90° (unclamping state). The body portion of each clamping device 32 is fixed to the flange portion 25a of the upper rim supporting member 25 so that the direction of the swing arm 32a in the clamping state coincides with the radial direction of the upper rim supporting member 25.

The connecting member 23, which is generally cylindrical, is fitted on an outer periphery surface of a portion (lower rim 22 side) lower than the flange portion 25a of the upper rim supporting member 25. An annular flange portion 23a is formed on an outer periphery of an upper end portion (center frame 6 side) of the connecting member 23. An upper surface of the flange portion 23a is in abutment against a lower surface of the flange portion 25a of the upper rim supporting member 25 and the swing arm 32a of each clamping device 32 provided at the flange portion 25a is engaged disengageably with a lower surface of the flange portion 23a. Therefore, the flange portion 23a of the connecting member 23 is clamped (urged) unclampably by the clamping devices 32 against the upper rim supporting member 25.

A lower end portion of the connecting member 23 is fixed to the upper rim 21 with annularly-provided fixing pieces 33 and bolts in a state in which the lower end portion is fitted in an upper portion (the side opposite to the tire supporting side) of the annular upper rim 21 along an inner periphery surface of the upper portion. More particularly, the upper portion of the upper rim 21 is smaller in inside diameter than a lower portion (the tire supporting side) of the upper rim and an annular convex portion 21a (see FIG. 6) is formed near a lower end of the inner periphery surface of the upper portion of the upper rim. In a state in which the convex portion 21a is held grippingly between annularly-provided flange portions 33a (see FIG. 6) formed at lower end portions of outer periphery surfaces of the fixing pieces 33 and a lower end face of the connecting member 23, the fixing pieces 33 are fixed to the connecting member 23 with bolts, whereby the connecting member 23 and the upper rim 21 are fixed together.

The upper rim 21 used in the post cure inflator 1 of this embodiment is same as that of an existing post cure inflator widely used in the market. The upper rim 21 has been attached to a body frame of the post cure inflator widely used in the market removably with use of fixing pieces having the same shape as the fixing pieces 33 and bolts. In this embodiment, therefore, the upper rim 21 is fixed to the connecting member 23 by utilizing a mounting portion which has been formed for mounting the existing upper rim 21 to the body frame of the post cure inflator widely used in the market (corresponding to the convex portion 21a in this embodiment).

A rotational axis direction changing device 41 and a motor 42 are attached to a tip of the lift beam 7. The rotational axis direction changing device 41 is for changing a rotational axis direction of input rotation of the motor 42 and providing an output. A vertically extending pinion gear 43 is connected to an output side of the rotational axis direction changing device 41.

The lock member 40, which is a vertically extending cylindrical member, is fixed to an upper surface of the lift beam 7. Thread grooves are formed on an outer periphery surface of the lock member 40. The concave portion 40a is formed at an upper end portion of the lock member 40, and at the upper portion of the concave portion 40a are formed plural pawl portions 40b with which the lower end portion of the locking shaft 27 comes into engagement disengageably.

An adjusting nut 44 having thread grooves on both inner and outer periphery surfaces thereof is threadedly fitted on the outer periphery surface of the lock member 40. A spur gear 44a meshing with the pinion gear 43 is fixed to a lower end portion of the adjusting nut 44. The spur gear 44a rotates as the pinion gear 43 is rotated by the motor 42, whereby the adjusting nut 44 moves vertically while rotating along the thread grooves formed on its inner periphery surface.

The lower rim supporting member 26, which is generally cylindrical and has thread grooves formed on an inner periphery surface thereof, is threadedly fitted on the outer periphery surface of the adjusting nut 44. A projecting plate 26b projecting horizontally is fixed to a lower end portion of the lower rim supporting member 26. An annular flange portion 26a is formed near an upper end of the lower rim supporting member 26. In the flange portion 26a is provided a circular hole 26c which permits a stopper member 45 to pass therethrough, the stopper member 45 being fixed to the lift beam 7 and extending vertically. Further, clamping devices 32 similar to the clamping devices 32 attached to the flange portion 25a of the upper rim supporting member 25 are attached to the flange portion 26a.

A through hole is formed in the projecting plate 26b and the stopper member 45 is inserted through the through hole. When the pinion gear 43 is rotated, allowing the adjusting nut 44 to move vertically under rotation, the projecting plate 26b engages the stopper member 45, whereby the rotation of the lower rim supporting member 26 is inhibited. Consequently, the lower rim supporting member 26 moves vertically, without rotation, with respect to the adjusting nut 44. Thus, the post cure inflator body 2 is configured so that the distance between the lower rim supporting member 26 and the lift beam 7 can be adjusted. A sensor (not shown) for detecting the position of the lower rim supporting member 26 is provided on the side frame 4. On the basis of the result of the detection made by the sensor, the motor 42 is operated to adjust the distance between the lower rim supporting member 26 and the lift beam 7, whereby the spacing between the upper and lower rims 21, 22 can be adjusted according to the size of a tire.

The connecting member 24 is formed in a generally cylindrical shape and is fitted on both an outer periphery surface of an upper portion of the adjusting nut 44 and an outer periphery surface of the upper end portion of the lower rim supporting member 26 (an upper portion than the flange portion 26a). An annular flange portion 24a is formed on an outer periphery of a lower end portion (lift beam 7 side) of the connecting member 24. A lower surface of the flange portion 24a is in abutment against an upper surface of the flange portion 26a of the lower rim supporting member 26 and a swing arm 32a of each clamping device 32 provided in the flange portion 26a is engaged with an upper surface of the flange portion 24a disengageably. Therefore, the flange portion 24a of the connecting member 24 is clamped (urged) to the lower rim supporting member 26 unclampably by the clamping devices 32.

An upper end portion of the connecting member 24 is fixed to the annular lower rim 22 by annularly-provided fixing pieces 33 and bolts in a state in which the upper end portion is fitted in a lower portion (the side opposite to the tire supporting side) of the lower rim 22 along an inner periphery surface of the lower portion. More particularly, the lower portion of the lower rim 22 is smaller in inside diameter than an upper portion (the tire supporting side) and an annular convex portion 22a (see FIG. 6) is formed near an upper end of the inner periphery surface of the lower portion or the lower rim. The fixing pieces 33 are fixed to the connecting member 24 with bolts in a state in which the convex portion 22a is held grippingly between the annularly-provided flange portions 33a (see FIG. 6) formed at the upper end portions of the outer periphery surfaces of the fixing pieces 33 and an upper end surface of the connecting member 24, whereby the connecting member 24 and the lower rim 22 are fixed together. Also as to the lower rim 22, like the upper rim 21, there is used an existing one which has been used in a post cure inflator widely used in the market.

The conveyance device 3 holds and conveys the tire T after vulcanized by the vulcanizer 60 up to the post cure inflator body 2 and further conveys the vulcanized tire T after inflated and cooled by the post cure inflator body 2 up to a stand-by position P1 (see FIG. 1). Further, at the time of replacing the upper and lower rims 21, 22 together with the connecting members 23, 24, the conveyance device 3 can hold and convey the rims 21, 22 and the connecting members 23, 24 from and to between the post cure inflator body 2 and the stand-by position P1.

Figure 5:
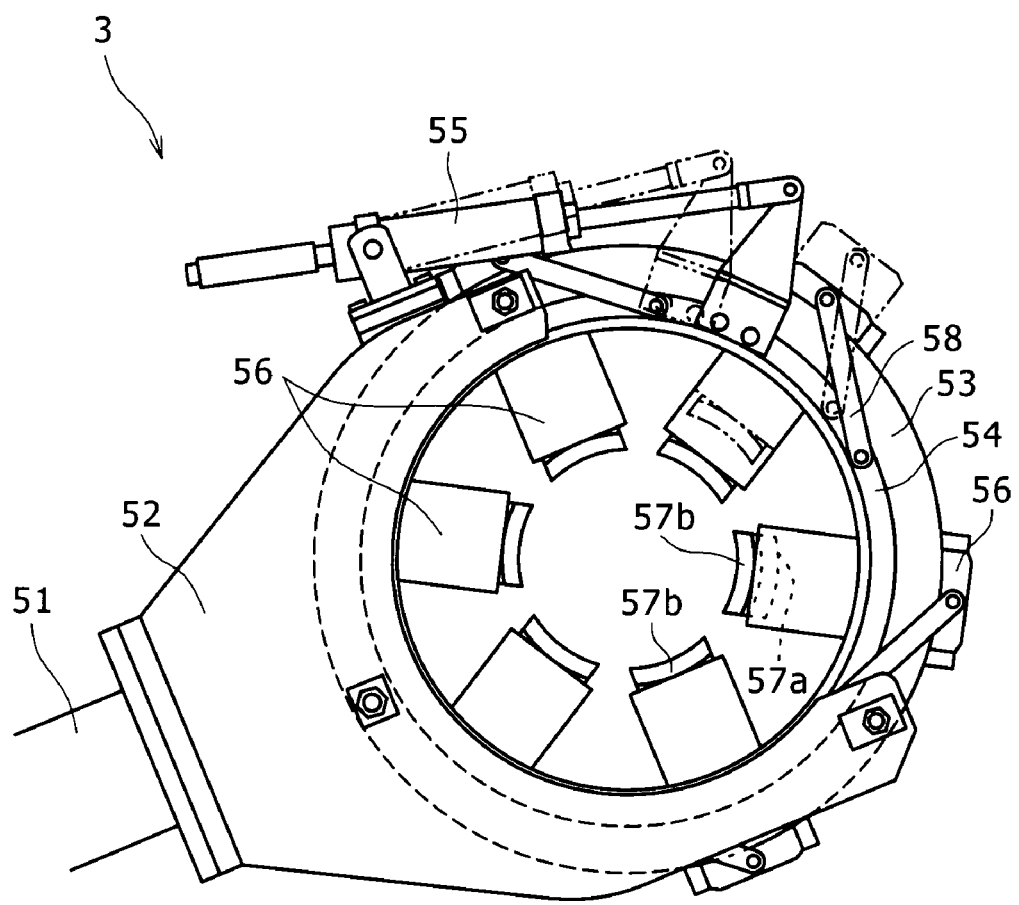
FIG. 5 is a partial enlarged plan view of a conveyance device used in the post cure inflator.

As shown in FIGS. 1 and 5, the conveyance device 3 includes a rotating arm 51, a support member 52, a fixed member 53, a movable member 54, a drive cylinder (chuck member drive means) 55 (e.g., a fluid cylinder or a power cylinder), plural slide plates 56, and plural chuck members 57 fixed to the plural slide plates 56 respectively.

One end of the rotating arm 51 is connected rotatably to a base portion (not shown) of the conveyance device 3. The rotating arm 51 is rotated horizontally about the one end thereof by rotating means such as, for example, a drive cylinder (not shown) and is driven vertically by lift means such as, for example, a drive cylinder (not shown). The rotating means and the lift means correspond to the moving means of the conveyance device used in the present invention.

The support member 52 is connected to an opposite end of the rotating arm 51. The fixed member 53, which is an annular member, is fixed to the support member 52 through a clearance formed between it and a lower surface of the support member 52. The movable member 54 is formed in an annular shape smaller in outside diameter than and almost equal in inside diameter to the fixed member 53. The movable member 54 is disposed between the fixed member 53 and the support member 52 and is mounted to the fixed member 53 so as to be movable in the circumferential direction. The fixed member 53 and the movable member 54 are connected together through the drive cylinder 55. By extending or retracting the drive cylinder 55, the movable member 54 rotates relatively in the circumferential direction with respect to the fixed member 53.

Figure 6:
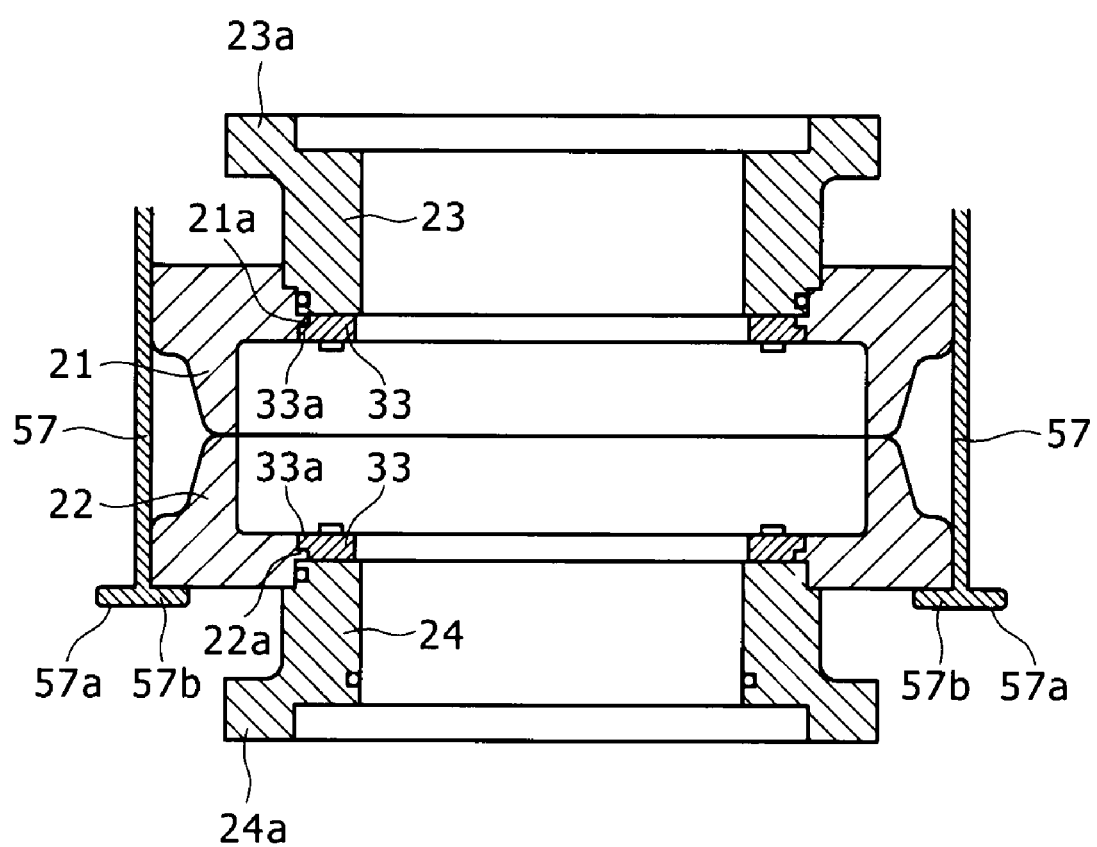
FIG. 6 is a partial enlarged sectional view of the conveyance device, showing a state in which the conveyance device holds upper and lower rims and connecting members of the rims.

The plural slide plates 56 are arranged side by side in the circumferential direction of the fixed member 53 and are mounted to a lower surface of the fixed member 53 so as to be movable in the radial direction. As shown in FIGS. 3 and 6, a downwards extending chuck member 57 is fixed to an end portion of each slide plate 56 which end portion is located on the center side of the fixed member 53.

As shown in FIG. 5, the slide plates 56 and the movable member 54 are connected to each other through arms 58. Therefore, when the movable member 54 is rotated relatively with respect to the fixed member 53 by the drive cylinder 55, the slide plates 56 and the chuck members 57 move radially of the movable member 54 with respect to the fixed member 53.

Tire grasping pawls 57a projecting radially outwards are formed at lower end portions of the chuck members 57, which are arranged circumferentially, respectively. The tire grasping pawls 57a hold an inner surface of an upper bead portion of the tire T to support the tire T from the inside. Further, rim supporting pawls 57b projecting radially inwards are formed at the lower end portions of the chuck members 57 respectively which are arranged in the circumferential direction. When replacing the upper and lower rims 21, 22 together with the connecting members 23, 24, as shown in FIG. 6, the rim supporting pawls 57b support the lower rim 22 from the outside in a state in which the upper and lower rims 21, 22 with the connecting members 23, 24 are stacked so as to be in contact with each other.

The motors 10, 42, drive cylinders 11, 29 and clamping devices 32 in the post cure inflator body 2, as well as the drive cylinder 55 in the conveyance device 3, are controlled by a control unit (not shown).

Next, a description will be given about the procedure for performing the inflating/cooling process for the vulcanized tire T using the post cure inflator 1.

When the vulcanizing/forming process using the vulcanizer 60 is over, the rotating arm 51 is raised and rotated to dispose the plural chuck members 57 between upper and lower molds of the vulcanizer 60. Next, the rotating arm 51 is moved down, allowing the plural chuck members 57 to be inserted inside the vulcanized tire T. Subsequently, the plural chuck members 57 arranged in the circumferential direction are moved radially outwards by the drive cylinder 55 and thereafter the rotating arm 51 is raised, allowing the tire T to be supported from the inside by the tire grasping pawls 57a. In this way, the tire T is held by the plural chuck members 57.

The post cure inflator body 2 is allowed to stand by in a descended state of the lower lift beam 7 (see FIGS. 2 and 3). At this time, the locking shaft 27 and the lock member 40 in the upper tire holding mechanism 20 are locked to each other. The upper rim supporting member 25 in the lower tire holding mechanism 20 is spaced apart from the stopper member 30 by the drive cylinders 31.

Next, the rotating arm 51 is rotated, causing the plural chuck members 57 which hold the tire T to move up to between the upper and lower rims 21, 22 in the lower tire holding mechanism 20 of the post cure inflator body 2. Subsequently, the rotating arm 51 is moved down and the tire T held by the plural chuck members 57 is placed onto the lower rim 22, then the plural chuck members 57 are moved radially inwards to release the tire T from its held state. Thereafter, the rotating arm 51 is raised and rotated so as to be moved away from the post cure inflator body 2.

Then, the lift beam 7 is raised to a predetermined position (in this embodiment an uppermost position where a stepped portion formed at a lower end of the lower guide rod 13 and a lower end of the lower guide bracket 12 contact each other), allowing a tip of the locking shaft 27 to be inserted into the concave portion 40a of the lock member 40. Thereafter, the locking shaft 27 is rotated a predetermined angle by the drive cylinder 29 to lock the lock member 40 and the locking shaft 27 to each other. As a result, the tire T is supported by the upper and lower rims 21, 22.

Subsequently, high pressure air is supplied into the tire T. As the air pressure in the tire T increases, the upper rim 21 rises against the force of the drive cylinders 31 and stops upon abutment of the upper rim supporting member 25 against the stopper member 30 (the state of FIG. 4). Thus, by providing the drive cylinders 31, the tire T can be sealed positively by the upper and lower rims 21, 22 when the supply of high pressure air into the tire T is started, and by stopping the upper rim 21 at a mechanical upper-limit position it is possible to maintain the rim-to-rim spacing at a predetermined value easily in the inflating/cooling process. In this state the tire T is cooled for a predetermined time. In the case where the inflating/cooling process is carried out simultaneously using the two tire holding mechanisms 20, the center frame 6 is rotated 180° to invert the two tire holding mechanisms 20 vertically.

When the inflating/cooling process is over, the air present in the tire T is discharged and then the locking shaft 27 is rotated to unlock the locking shaft 27 and the lock member 40 from each other. Next, the lower lift beam 7 is moved down to separate the upper and lower rims 21, 22 from each other. At this time, the tire T is on the lower rim 22. Thereafter, with the conveyance device 3, the tire T is conveyed onto a belt conveyor (not shown) which is installed at the stand-by position P1. Then, the plural chuck members 57 are moved radially inwards to remove the tire T.

Next, the following description is provided about the procedure for replacing the upper and lower rims 21, 22.

The lower lift beam 7 is raised to an uppermost limit by the drive cylinder 11 and, if necessary, the lower rim 22 is raised with respect to the lower lift beam 7 by the motor 42, thereby causing the upper and lower rims 21, 22 to contact each other. Then, the clamping devices 32 provided in the upper rim supporting member 25 are released from their clamping state. Subsequently, the locking shaft 27 is rotated a predetermined angle to unlock the locking shaft 27 and the lock member 40 from each other, then the lower lift beam 7 is moved down. At this time, the upper rim 21 with the connecting member 23 fixed thereto lies on the lower rim 22.

Next, the plural chuck members 57 are moved radially outwards and, with the conveyance device 3, are moved from the stand-by position P1 to the post cure inflator body 2, then are moved down. Subsequently, the plural chuck members 57 are moved radially inwards so as to hold outer periphery surfaces of the upper and lower rims 21, 22.

Thereafter, the clamping devices 32 provided in the lower rim supporting member 26 are released from their clamping state. Then, with the conveyance device 3, the plural chuck members 57 are raised, whereby, as shown in FIG. 6, a lower surface of the lower rim 22 is supported from the outside by the rim supporting pawls 57b and the upper and lower rims 21, 22 and the connecting members 23, 24 are held by the plural chuck members 57. At this time, the upper rim 21 and lower rim 22 are not fixed, but since the plural chuck members 57 arranged in the circumferential direction hold the outer periphery surface of the upper rim 21, off-center of the upper rim 21 to the lower rim 22 can be prevented. Thereafter, with the conveyance device 3, the plural chuck members 57 holding the upper and lower rims 21, 22 and also holding the connecting members 23, 24 are moved to the stand-by position P1. Through these operations the upper and lower rims 21, 22 and the connecting members 23, 24 are removed from the post cure inflator body 2.

Then, in the case where the upper and lower rims 21, 22 in the upper tire holding mechanism 20 are also to be removed, the lower lift beam 7 without rims is raised to lock the locking shaft 27 and the lock member 40 to each other, thereafter the center frame 6 is rotated 180° and the same operations as above are performed.

Next, the connecting members 23, 24 are fixed respectively to another upper and lower rims 21, 22 than the removed upper and lower rims 21, 22, then the upper and lower rims 21, 22 are stacked vertically one on the other and disposed at the stand-by position P1. This stacked body of the upper and lower rims 21, 22 and the connecting members 23, 24 is held by the plural chuck members 57 and is then conveyed to the post cure inflator body 2 by the conveyance device 3. In this state the post cure inflator body 2 stands by in a lowered state of the lower lift beam 7.

Then, the plural chuck members 57 are moved down by the conveyance device 3, allowing the adjusting nut 44 to be inserted along the inner periphery of the connecting member 24 which is held by the plural chuck members 57. At the same time, the lower surface of the flange portion 24a of the connecting member 24 is rested on the flange portion 26a of the lower rim supporting member 26. In this state, an outer periphery of an upwards projecting portion projecting from the flange portion 26a of the lower rim supporting member 26 is fitted in along an inner periphery of the bottom end portion of the connecting member 24. Subsequently, the lower rim supporting member 26 and the connecting member 24 are clamped by the clamping devices 32 provided in the lower rim supporting member 26. Thereafter, the plural chuck members 57 are moved radially outwards, allowing the lower rim 22 to be released from its chucked state by the chuck members 57. Then, the plural chuck members 57 are retracted from the post cure inflator body 2 by the conveyance device 3.

Next, the lower lift beam 7 is raised and, where required, the lower rim 22 is raised with respect to the lower lift beam 7 by the motor 42, thereby causing the upper surface of the flange portion 23a of the connecting member 23 to come into contact with the lower surface of the flange portion 25a of the upper rim supporting member 25. In this state, an outer periphery of the downwards projecting portion projecting from the flange portion 25a of the upper rim supporting member 25 is fitted in along an inner periphery of the top end portion of the connecting member 23. Subsequently, with the clamping devices 32 provided in the upper rim supporting member 25, the upper rim supporting member 25 and the connecting member 23 are clamped and the locking shaft 27 and the lock member 40 are locked. Through these operations the upper and lower rims 21, 22 are secured to the post cure inflator body 2.

Thereafter, the distance between the lower rim supporting member 26 and the lift beam 7 is adjusted by the motor 42 so as to give a predetermined value of the rim-to-rim spacing in the inflating/cooling process.

In the post cure inflator 1 described above, the upper and lower rims 21, 22 are fixed to one end portions of the connecting members 23, 24, which are clamped at the opposite end portions thereof to the upper and lower rim supporting members 25, 26 unclampably by the clamping devices 32. Therefore, for removing the upper and lower rims 21, 22 from the center frame 6 and the lift beam 7, the clamping devices 32 are switched to their unclamping state by a control unit (not shown) and the connecting members 23, 24 together with the upper and lower rims 21, 22 are removed from the upper and lower rim supporting members 25, 26. Conversely, for mounting the upper and lower rims 21, 22 to the center frame 6 and the lift beam 7, the connecting members 23, 24 to which the upper and lower rims 21, 22 are fixed are mounted to the upper and lower rim supporting members 25, 26 with use of the clamping devices 32. Thus, since the clamping devices 32 are used for mounting and removal of the connecting members 23, 24 to and from the upper and lower rim supporting members 25, 26, the mounting and removing operations can be done easily. And hence it is possible to effect the replacement of rims easily. Further, since the connecting members 23, 24 are pushed toward the upper and lower rim supporting members 25, 26 by the clamping devices 32, it is possible to prevent wobbling of the upper and lower rims 21, 22.

The upper rim 21 and the connecting member 23 are fixed together manually and so are the lower rim 22 and the connecting member 24, using fixing pieces 33 and bolts. Since this operation can be done at a place spaced away from the post cure inflator body 2 and superior in workability, the replacement of rims can be done easily.

The flange portions 23a, 24a of the connecting members 23, 24 can be clamped at any position in the circumferential direction by the clamping devices 32 because they are annular. Thus, since the flange portions 23a, 24a are formed annularly, it is not necessary to make a circumferential alignment between the connecting members 23, 24 and the upper and lower rim supporting members 25, 26 when mounting the connecting members 23, 24 with the upper and lower rims 21, 22 fixed thereto to the upper and lower rim supporting members 25, 26. Consequently, the replacement of rims can be done more easily.

The clamping devices 32 are fixed to the flange portions 25a, 26a of the upper and lower rim supporting members 25, 26 respectively so that the direction (longitudinal direction) of their swing arms 32a in the clamping state coincides with the radial direction of the upper and lower rim supporting members 25, 26 and the direction of their swing arms 32a in the unclamping state coincides with the circumferential direction of the upper and lower rim supporting members 25, 25. In the unclamping state, since the swing arms 32a are positioned outside the outer peripheries of the flange portions 23a, 24a of the connecting members 23, 24, the swing arms 32a do not obstruct the replacement of rims, and rim replacing work therefore can be done smoothly.

Besides, since the clamping devices 32 are air pressure-actuated swing type clamping devices, they are little adversely affected by the leak of working fluid.

Moreover, the rims 21, 22 are mounted to the center frame 6 and the lift beam 7 through the connecting members 23, 24, so by forming the connecting members 23, 24 in a shape matching the shape of existing rim mounting portions (corresponding to the annular convex portions 21a, 22a in this embodiment), it is possible to use existing rims as they are.

Further, by replacing the connecting members 23, 24, the upper and lower rims 21, 22 used in this embodiment can be mounted to a body frame of another post cure inflator than the post cure inflator of this embodiment. In case of mounting the upper and lower rims 21, 22 used in this embodiment to the body frame of the existing post cure inflator separate from the post cure inflator of this embodiment, this can be done by forming end portions of the connecting members 23, 24 on the side opposite to the rims in the same shape as the mounting portions formed in the existing upper and lower rims.

Further, since the connecting members 23, 24 are fitted and fixed into the mounting-side end portions of the upper and lower rims 21, 22, it is possible to use common connecting members 23, 24 irrespective of the size of the outside diameter of each of the upper and lower rims 21, 22.

In the post cure inflator body 2, as described above, the rim-to-rim spacing can be adjusted by adjusting the distance between the lift beam 7 and the lower rim supporting member 26 and this adjustment is made by operation of the motor 42. Therefore, in comparison with adjusting the rim-to-rim spacing manually using a spacer or the like, not only the adjustment of the rim-to-rim spacing can be done easily, but also it is possible to shorten the time required for the adjustment of the rim-to-rim spacing.

The plural chuck members 57 in the conveyance device 3 have rim supporting pawls 57b projecting toward the center of the movable member 54, in addition to the tire grasping pawls 57a, so when replacing the upper and lower rims 21, 22, loading and unloading of the upper and lower rims 21, 22 and the connecting members 23, 24 to and from the post cure inflator body 2 can be done using the conveyance device 3. Accordingly, as compared with conveying the rims by a manual operation, the rim replacement can be done more easily and it is possible to shorten the time required for the rim replacement.

Next, the following description is provided about modifications involving various changes made to the above embodiment. However, as to the components having the same configurations as in the above embodiment, the same reference numerals as above will be used and explanations thereof will be omitted accordingly.

1] Although, in the above embodiment, air pressure-actuated swing type clamping devices are used as the clamping devices 32 for clamping the connecting members 23, 24 to the rim supporting members 25, 26, the clamping devices 32 may be, for example, oil pressure-actuated swing type clamping devices. Further, there may be used clamping devices other than the swing type (e.g., clamping devices having clamp members capable of advancing and retreating radially of the flange portions 23a, 24a of the connecting members 23, 24 to clamp the flange portions 23a, 24a).

2] Although, in the above embodiment, the upper rim 21 and the connecting member 23 are fixed together with the fixing pieces 33 and bolts, and so are the lower rim 22 and the connecting member 24 in a state in which each connecting member is fitted in along the inner periphery surface of the mounting-side end portion of the associated rim, the fixing method for each rim and the associated connecting member is not limited thereto. For example, there may be adopted a construction wherein the lower end of the connecting member 23 is fixed to the center frame 6-side end face of the upper rim 21.

3] Although, in the above embodiment, there are utilized existing upper and lower rims 21, 22 and the upper and lower rims 21, 22 are fixed to the connecting members 23, 24, respectively, by utilizing the mounting portions preformed in the upper and lower rims 21, 22, it is not always necessary to fix the connecting members 23, 24 with use of the mounting portions in the case where the fixing can be done by any other fixing method.

4] In the above embodiment, when the stacked body of vertically stacked upper and lower rims 21, 22 with the connecting members 23, 24 fixed thereto are to be held by the plural chuck members 57, the stacked body is held by supporting the lower rim 22 with the rim supporting pawls 57b, but the stacked body may be held by supporting the connecting member 24 with rim supporting pawls 57b for example in the case where a maximum outside diameter of the connecting member 24 (the outside diameter of the flange portion 24a) is larger than the outside diameter of the lower rim 22.

5] In the above embodiment, when replacing the rims, the upper and lower rims 21, 22 and the connecting members 23, 24 are together held and conveyed by the plural chuck members 57, the conveyance may be made dividedly, that is, the conveyance of the upper rim 21 and the connecting member 23 and that of the lower rim 22 and the connecting member 24 may be made separately.

6] Although, in the above embodiment, the tire grasping pawls 57a and the rim supporting pawls 57b are formed at the lower end portions of the chuck members 57, a vertical position of each tire grasping pawl 57a and that of each rim supporting pawl 57b may be different from each other. For example, each rim supporting pawl 57b may be formed at the lower end portion of the associated chuck member 57 and each tire grasping pawl 57a may be formed at a vertically intermediate position of the associated chuck member 57.

What is claimed is:

1. A post cure inflator for inflating and cooling a vulcanized tire by sealing high pressure air into the vulcanized tire, the post cure inflator comprising:
   a body frame;
   a rim for supporting the vulcanized tire at a bead portion of the vulcanized tire;
   a connecting member fixed at one end thereof to said rim;
   a rim supporting member provided in said body frame;
   a swingable and releasable clamping device provided in either said body frame or said rim supporting member to releasably clamp said connecting member to said rim supporting member; and
   a conveyance device for loading and unloading of the vulcanized tire, said conveyance device including tire grasping pawls configured for supporting the vulcanized tire from inside the tire bead, and being movable to a position where a vulcanized tire supported by the grasping pawls is coaxial with the rim supporting member to load the vulcanized tire onto the rim.

2. The post cure inflator according to claim 1, wherein said connecting member is formed in a cylindrical shape, one end portion in a cylinder axis direction of said connecting member is fitted in said rim, and an opposite end portion in the cylinder axis direction of said connecting member is releasably clamped to said rim supporting member by said clamping device.

3. The post cure inflator according to claim 2, wherein an annular flange portion is formed at the opposite end portion of said connecting member, and said annular flange portion is releasably clamped to said rim supporting member by said clamping device.

4. The post cure inflator according to claim 1, wherein two said rims are disposed side by side in the vertical direction, and
said conveyance device includes:
a plurality of chuck members arranged side by side in the circumferential direction of the vulcanized tire and projecting radially outwards of the vulcanized tire, said chuck members being formed with said tire grasping pawls;
chuck member drive means for moving said plural chuck members radially of the vulcanized tire; and
moving means for moving said plural chuck members in the vertical and horizontal directions,
said chuck members being formed with, in addition to said tire grasping pawls, rim supporting pawls projecting radially inwards of the vulcanized tire to support, from outside, one of said rims which is disposed on a lower side or one of said connecting members which is disposed on a lower side.

5. The post cure inflator according to claim 1, wherein
said swingable clamping device includes a fluid pressure actuation device for swinging the clamping device.

6. The post cure inflator according to claim 1, wherein
said body frame is configured so as to be capable of adjusting the spacing between two said rims that support the tire, and
said body frame includes a motor for adjusting the spacing between said rims.

\* \* \* \* \*